R. H. WAPPLER.
ENDOSCOPE.
APPLICATION FILED MAR. 26, 1908.
922,985.
Patented May 25, 1909.
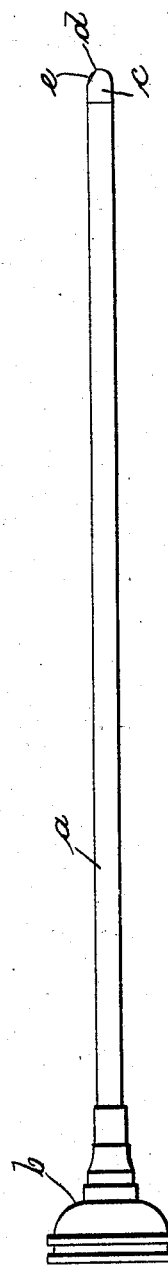
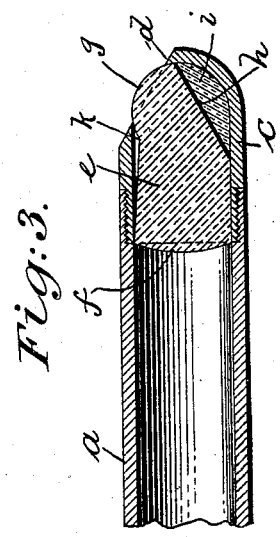
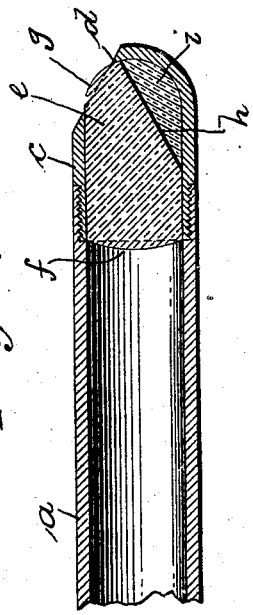
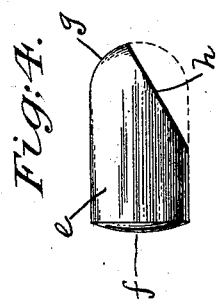
Witnesses:
Chas H. Smith
A. L. Serrell
Inventor:
Reinhold H. Wappler
By Harold Serrell
His Attorney.
THE NORRIS PETERS CO., WASHINGTON, D. C.

UNITED STATES PATENT OFFICE.

REINHOLD H. WAPPLER, OF NEW YORK, N. Y., ASSIGNOR TO AMERICAN CYSTOSCOPE MAKERS INC., OF NEW YORK, N. Y., A CORPORATION OF NEW YORK.

ENDOSCOPE.

No. 922,985.          Specification of Letters Patent.          Patented May 25, 1909.

Application filed March 26, 1908. Serial No. 423,350.

*To all whom it may concern:*

Be it known that I, REINHOLD H. WAPPLER, a citizen of the United States, residing in the borough of Manhattan, city, county, and State of New York, have invented an Improvement in Endoscopes, of which the following is a specification.

This invention relates to endoscopes and similar optical instruments and particularly to a peculiar form of lens employed therein.

Heretofore and as shown in Letters Patent No. 878917, granted to me February 11th, 1908, for an improvement in endoscopes, the instruments to which this invention relates have been constructed with a tip or end member adapted to be connected to the tube or body of the instrument and fitted with a combined end lens and reflecting surface and a separate back lens or objective glass and while instruments of this construction,—that is to say, having these separate lenses,—have proved quite satisfactory, the object of my present invention is an improvement thereon, in that the lens made according to my present invention absorbs less light and offers less resistance to the passage thereof and consequently transmits more light than the combination of separate lenses shown and described in the Letters Patent aforesaid, and therefore while the peculiar form of lens comprising the present invention, performs the same function in the instrument as is performed by the combination of lenses shown in the aforesaid Letters Patent, this function is performed in a much more efficient manner.

In carrying out my present invention, I preferably employ a tube fitted with an eye piece and the necessary intermediate lenses and provided with a removable tip or end in which is mounted a lens to which the present invention particularly relates and this lens is preferably made of a glass cylinder having an objective lens face at one end thereof and a combined convex face and reflecting surface at the other end, as will be hereinafter more particularly described.

In the drawing, Figure 1 is an elevation of an endoscope in which the present invention is embodied. Fig. 2 is a central longitudinal section of the end of the tube of the endoscope and the removable tip therefor fitted with my improved lens. Fig. 3 is a view similar to Fig. 2, illustrating a slightly modified form of the lens. Fig. 4 is an elevation of the lens shown in section in Fig. 2, and Fig. 5 is an elevation of the lens shown in section in Fig. 3,—Figs. 2–5 inclusive being on an enlarged scale.

Referring particularly to the drawings, $a$ designates a metal tube forming the body portion of an endoscope as is customary in the art to which this invention relates. The tube $a$ as usual, is fitted with an eye-piece $b$ at one end thereof and at the opposite end with a tip member $c$ which is detachably connected thereto in any desired manner. As shown in the drawing, this tip member $c$ is provided with an aperture $d$ and is fitted with a lens $e$. The present invention relates particularly to the form of this lens $e$, which as is clearly shown in the drawing, preferably comprises a cylindrical body of glass, at one end of which a convex objective lens face $f$ is ground, while on the other end the convex front lens face $g$ is ground. Furthermore a portion of the lens adjacent to the face $g$ is ground down to provide a reflecting surface $h$ which is silvered or otherwise finished to cause the face $h$ to have the desired reflecting properties.

As will be understood, the lens immediately hereinbefore described, is a compound reflective lens, and that the center of curvature of the convex face at one end lies in the principal axis of the lens, while the reflecting surface is at the same angle to the principal axis of the lens as to the radius from the center of the other or adjacent convex face.

The lens $e$ is adapted to fit within the tip member $c$ with a portion of the front lens face $g$ projecting slightly through the aperture $d$ and as will be understood, may or may not be provided with a suitable filling $i$ between the reflecting face $h$ of the lens and the adjacent portion of the tip $c$.

Referring particularly to Figs. 3 and 5, the cylindrical portion of the lens may be provided with a recess $k$ caused by increasing the extent of the convex face of the front lens in order to give the lens a wider field of vision and as will be also understood, the angle at which the face $h$ is ground, may be varied, depending upon the direction of the field of vision desired.

I claim as my invention:

1. In an endoscope or similar instrument, a tube, an eye-piece therefor and a transparent cylindrical body mounted in said tube, the said cylindrical body being formed at one end with an objective lens face and at the other with a front lens face and adjacent reflecting surface, substantially as described.

2. In an endoscope or similar instrument, a tube, an eye-piece therefor, a removable tip and a transparent cylindrical body mounted in said removable tip and formed at one end with an objective lens face and at the other with a front lens face and an adjacent reflecting surface, substantially as described.

3. In an endoscope or similar instrument, a tube, an eye-piece therefor, a removable tip having an aperture therein and a transparent cylindrical body mounted in said removable tip, the said transparent body being formed at one end with an objective lens face and at the other with a front lens face and an adjacent reflecting surface, a portion of the said front lens face extending slightly through the aperture in said tip.

4. In an endoscope or similar instrument, a transparent cylindrical body formed at one end with an objective face, the center of whose curvature lies in the principal axis of the lens and at the other end with a front lens face and an adjacent reflecting surface, which latter is at the same angle to the principal axis of the lens as to the radius from the center of the said front lens face.

Signed by me this 10th day of March, 1908.

REINHOLD H. WAPPLER.

Witnesses:
 GEO. T. PINCKNEY,
 BERTHA M. ALLEN.